(12) United States Patent
Ingram, III et al.

(10) Patent No.: US 9,073,625 B1
(45) Date of Patent: Jul. 7, 2015

(54) HELICOPTER ROTOR YOKE

(75) Inventors: Theodore W. Ingram, III, Fort Worth, TX (US); James L. Braswell, Jr., Colleyville, TX (US); Dharam J. Reddy, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 642 days.

(21) Appl. No.: 13/024,732

(22) Filed: Feb. 10, 2011

Related U.S. Application Data

(60) Provisional application No. 61/303,369, filed on Feb. 11, 2010.

(51) Int. Cl.
*B64C 11/12* (2006.01)
*B64C 27/33* (2006.01)

(52) U.S. Cl.
CPC ................ *B64C 11/12* (2013.01); *B64C 27/33* (2013.01)

(58) Field of Classification Search
CPC ........ B64C 27/54; B64C 27/57; B64C 27/12; B64C 27/32; B64C 27/33; B64C 27/48; B64C 11/02; B64C 11/12
USPC .......... 416/131, 134 A, 134 R, 204 R, 210 A, 416/210 R, 204 A, 244 R, 244 A
See application file for complete search history.

(56) References Cited

U.S. PATENT DOCUMENTS 4,293,276 A * 10/1981 Brogdon et al. .......... 416/134 A
2012/0201683 A1 * 8/2012 Stamps et al. ............ 416/204 R

* cited by examiner

*Primary Examiner* — Edward Look
*Assistant Examiner* — Juan G Flores
(74) *Attorney, Agent, or Firm* — James E. Walton; Damon R. Hickman

(57) ABSTRACT

A helicopter rotor yoke includes a composite laminate having a plurality of plies of fibers disposed in a polymeric matrix. The polymeric matrix includes a toughened polymer at one of a location or zone that experiences high strain levels during use of the rotor yoke.

13 Claims, 3 Drawing Sheets

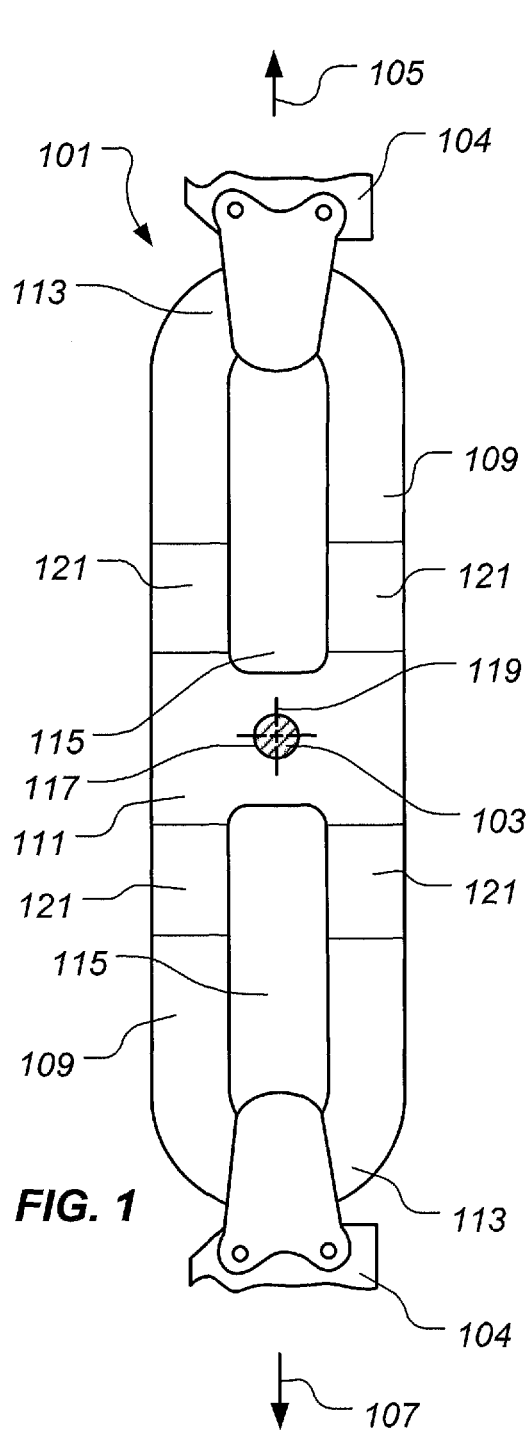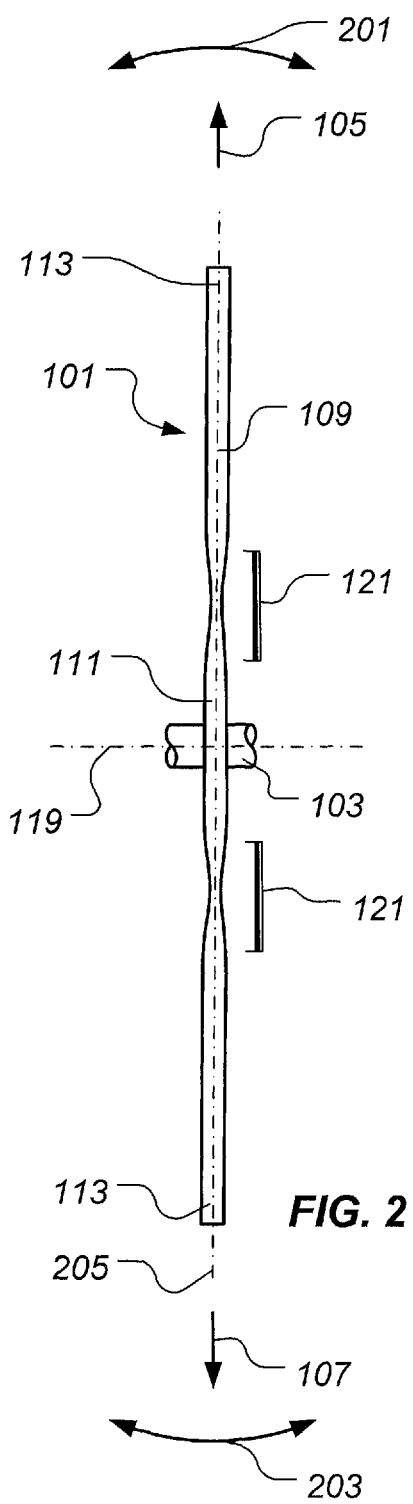

HELICOPTER ROTOR YOKE

BACKGROUND

1. Technical Field

The present application relates to helicopters and, in particular, to yokes for mechanically coupling helicopter blades to a mast.

2. Description of Related Art

Each blade of the main rotor assembly of a helicopter must be connected to a main support mast, usually by means of a rotor yoke, in a manner allowing several degrees of freedom. Such an interconnection is subjected to high and repeated stresses of both torsional and centrifugal natures, and is therefore an extremely important component of the aircraft. Each blade must be able to rotate about its longitudinal axis to provide pitch control. Each blade must be able to flap in a direction perpendicular to the rotor plane to accommodate vertical loads. In some instances, each blade must be able to pivot within the rotor plane to provide for lead-lag control. The manner in which the blades are secured to the main support mast enables a helicopter to be controlled and maneuvered in flight.

Various structures and mechanisms have been utilized to interconnect the helicopter blades and the support mast. The prior art includes several examples of articulated metal couplings. Such couplings have suffered from the disadvantages of weight, cost, high maintenance requirements, and low useful life. There have been several attempts to eliminate one or more of the articulations in such couplings in order to simplify construction and reduce costs. Some rotor hubs or yokes are pivotally secured to the support mast, and are characterized by a flat plate construction resilient enough to act as a virtual hinge and thereby accommodate flapping of the blades.

More recently, glass fibers and other composite materials have been employed in the fabrication of helicopter rotor system components. For example, a rotor yoke has been constructed by forming a loop from wound filaments with layers of cross plies normal to the central plane of the loop arranged only in the sides thereof. In comparison to a machined metal forging, glass fibers and other composite materials have more favorable fatigue characteristics resulting in longer useful life. In addition, the use of such materials simplifies construction and reduces costs. One of the problems encountered in utilizing such materials in helicopter rotor yokes, however, has been separation of the composite material layers, known as delamination, resulting from excessive mechanical strain. For example, in some situations, a helicopter blade may flap to a greater degree than desired. In such cases, the excessive flapping places stresses on particular portions of the yoke that exceed the interlaminar strength of the composite material in those areas. Moreover, the allowable degree of blade flapping available for a particular helicopter design is limited by the interlaminar strength of the composite material.

There are many designs of helicopter yokes well known in the art; however, considerable shortcomings remain.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 1 is a top, plan view of an illustrative embodiment of a rotor yoke;

FIG. 2 is a side, elevational view of the rotor yoke of FIG. 1;

Figure 3:
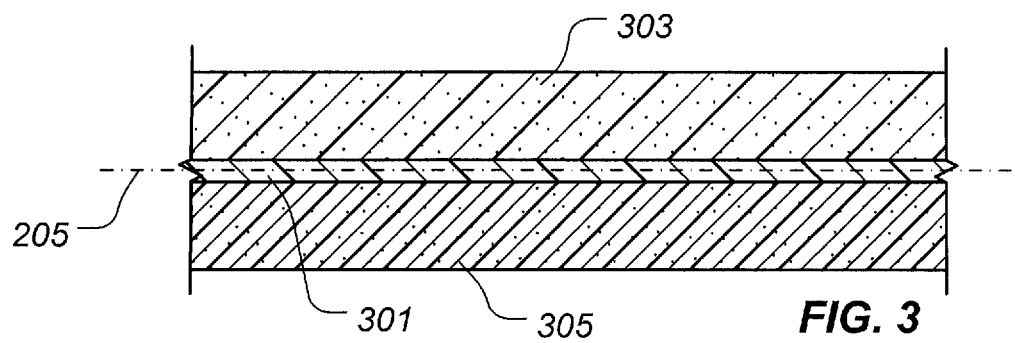
FIGS. 3 and 4 are stylized, enlarged, cross-sectional views of particular embodiments of a portion of the rotor yoke of FIG. 1 proximate a midplane of the rotor yoke.

While the system of the present application is susceptible to various modifications and alternative forms, specific embodiments thereof have been shown by way of example in the drawings and are herein described in detail. It should be understood, however, that the description herein of specific embodiments is not intended to limit the system of the present application to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application represents a helicopter yoke comprising a composite laminate. The composite laminate comprises a plurality of fiber plies disposed in a polymeric matrix. The polymeric matrix adhesively bonds adjacent fiber plies to one another. At one or more locations or within one or more zones of the yoke that are expected to experience high levels of mechanical strain, the polymeric matrix comprises an elastomer.

For the purposes of this disclosure, "strain" the geometrical expression of deformation caused by the action of stress on a physical body. Locations or zones that experience high strain are those locations or zones that are subjected to strain levels that are higher than the average strain experienced by the helicopter yoke in a particular loading configuration. Moreover, for the purposes of this disclosure, the term "toughened polymer" means a polymer that includes one or more elastomeric components. For example, an elastomeric component particularly well suited is an adhesive commercially available from 3M™ under the trade name ScotchWeld™ type AF163-2. Correspondingly, the term "toughened epoxy" means an epoxy polymer that includes one or more elastomeric components. The polymeric matrix may include any suitable fiber/resin system; however, the systems commercially available under the trade names Hexcell 8552 S-2 and Cytec-Fiberite, type E773 S-2, are particularly well suited. It should be understood that other composite materials may be used, depending upon particular applications and the particular structural characteristics desired.

FIGS. 1 and 2 depict an illustrative embodiment of a helicopter rotor yoke 101 according to the present application. FIG. 1 provides a top, plan view of rotor yoke 101 and FIG. 2 depicts a side, elevational view of rotor yoke 101. Rotor yoke 101 is employed to interconnect a mast 103 and a pair of helicopter blades 104 extending in the directions of arrows 105 and 107. Helicopter blades 104 are not shown in FIG. 2 for clarity. Note that, while mast 103 and helicopter blades 104 are illustrated, mast 103 and helicopter blades 104 do not form part of rotor yoke 101 but are shown to depict the relationship between mast 103, rotor yoke 101, and helicopter blades 104. In the illustrated embodiment, the general configuration of rotor yoke 101 is that of an elongated loop. Rotor yoke 101 includes a pair of spaced apart longitudinal side portions 109 interconnected by a transverse central portion 111, at which mast 103 is mounted. The ends of side portions 109 are interconnected by rounded, outboard portions 113, to which helicopter blades 104 are coupled. Side portions 109, central portion 111, and outboard portions 113 define, in this particular embodiment, two openings 115 in which various components of the helicopter are mounted but not shown. In some embodiments, however, openings 115 are omitted. Helicopter mast 103 is received through a passageway 117 defined by central portion 111, such that a central, longitudinal axis 119 of mast 103 substantially coincides with a center of rotor yoke 101.

In the illustrated embodiment, each side portion 109 of rotor yoke 101 defines two flexure portions 121. Flexure portions 121 are located outboard of central portion 111 and comprise fewer composite plies than, for example, other portions of side portions 109, resulting in reduced cross sections of flexure portions 121. Provision of flexure portions 121 permits helicopter blades 104 to flap in the directions of arrows 201 and 203. The amount of reduction in cross-sectional area of flexure portions 121 is tailored to the specific flexural requirements of a rotor assembly and, thus, is implementation specific.

One or more locations and/or one or more zones of rotor yoke 101 are subjected to high levels of mechanical strain during use. For example, high levels of mechanical strain are often experienced generally along a midplane 205 of rotor yoke 101. Failure of conventional rotor yokes is often experienced in such a zone because the polymer used in such conventional rotor yokes is incapable of accommodating the high strain levels. As shown in FIG. 3, however, one particular embodiment of rotor yoke 101 comprises a polymeric layer 301 disposed generally along midplane 205 and adhesively bonding adjacent plies 303 and 305. Polymeric layer 301 comprises a toughened polymer. In a preferred embodiment, polymeric layer 301 comprises a toughened epoxy. Polymeric layer 301 accommodates the high levels of strain often experienced along midplane 205 by elastically deforming while remaining adhesively bonded to plies 303 and 305.

It should be noted that one or both of plies 303 and 305 may comprise fibers alone. In such a configuration, polymeric layer 301 adhesively bonds the fibers of ply 303 to the fibers of ply 305. It should also be noted that one or both of plies 303 and 305 may comprise fibers disposed in a polymeric matrix. In such a configuration, polymeric layer 301 adhesively bonds the polymeric matrix of ply 303 to the polymeric matrix of ply 305.

Figure 4:
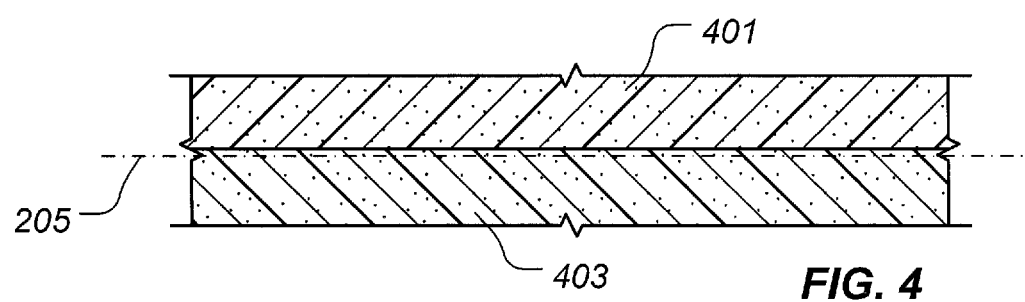

Alternatively, as shown in FIG. 4, plies 401 and 403 that are disposed proximate midplane 205 may comprise fibers disposed in a toughened polymeric matrix. In such a configuration, a polymeric layer, such as polymeric layer 301 of FIG. 3, is not required but may be included between plies 401 and 403 because the toughened polymeric matrices in which the fibers of plies 401 and 403 are disposed are capable of accommodating the high levels of strain often experienced along midplane 205.

Figure 5:
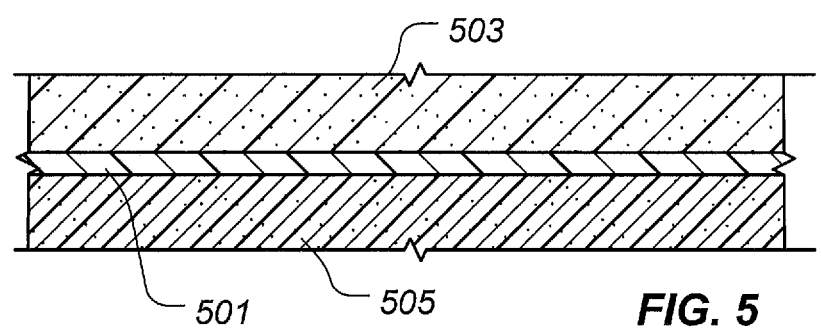
FIGS. 5 and 6 are stylized, enlarged, cross-sectional views of particular embodiments of a portion of the rotor yoke of FIG. 1.

Referring now to FIG. 5, rotor yoke 101 may experience high strain levels between plies that comprise fibers exhibiting different geometric orientations, since forces carried by the fibers are oriented in different directions. In the embodiment of FIG. 5, rotor yoke 101 comprises a polymeric layer 501 adhesively bonding adjacent plies 503 and 505. Ply 503 includes fibers having one or more geometric orientations that are different from ply 505. For example, ply 503 may comprise fibers exhibiting ±45 degree orientations, while ply 505 comprises fibers exhibiting 0 degree/90 degree orientations. Polymeric layer 501 comprises a toughened polymer. In a preferred embodiment, polymeric layer 501 comprises a toughened epoxy. Polymeric layer 501 accommodates the high levels of strain often experienced between plies 503 and 505 by elastically deforming while remaining adhesively bonded to plies 503 and 505.

It should be noted that one or both of plies 503 and 505 may comprise fibers alone. In such a configuration, polymeric layer 501 adhesively bonds the fibers of ply 503 to the fibers of ply 505. It should also be noted that one or both of plies 503 and 505 may comprise fibers disposed in a polymeric matrix. In such a configuration, polymeric layer 501 adhesively bonds the polymeric matrix of ply 503 to the polymeric matrix of ply 505.

Figure 6:
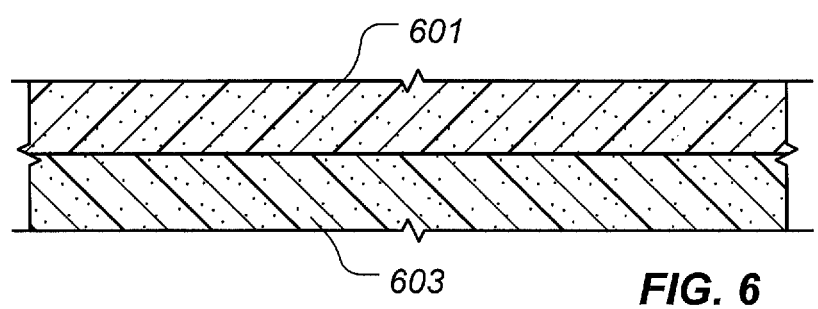

Alternatively, as shown in FIG. 6, plies 601 and 603 that are disposed proximate midplane 205 may comprise fibers disposed in a toughened polymeric matrix. In such a configuration, a polymeric layer, such as polymeric layer 501 of FIG. 5, is not required but may be included between plies 601 and 603 because the toughened polymeric matrices in which the fibers of plies 601 and 603 are disposed are capable of accommodating the high levels of strain often experienced along midplane 205.

Figure 7:
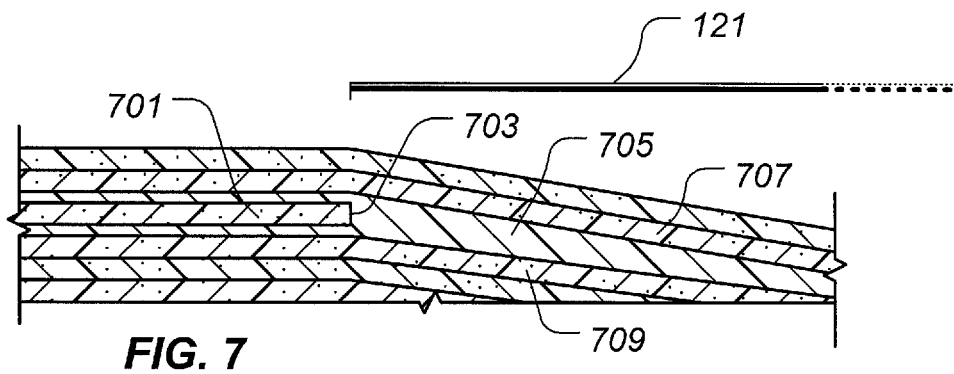
FIG. 7 is a stylized, enlarged, cross-sectional view of part of a flexure portion of the rotor yoke of FIG. 1.

High strain levels are often experienced within flexure portion 121 (shown in FIGS. 1 and 2) of rotor yoke 101 during use. Reference is now made to FIG. 7, which is an enlarged, cross-sectional view of a part of one of the flexure portions 121. One or more plies of composite material, such as ply 701, extends to flexure portion 121, but not into flexure portion 121, to achieve at least in part the reduced cross-sectional thickness of flexure portion 121, as compared to portions of rotor yoke 101 adjacent to flexure portion 121. End 703, commonly known as a "drop off", of ply 701 forms a "stress riser" at which high levels of strain are experienced during use of rotor yoke 101. In one embodiment, rotor yoke 101, however, includes a toughened polymeric material, such as layer 705, adhesively bonding plies 707 and 709 to "dropped off" ply 701. Specifically, layer 705 fills a gap adjacent end 705 of ply 701 with a material having elastic properties that would likely not be filled if layer 705 were not present. Thus, when rotor yoke 101 is mechanically loaded during use and plies 707 and 709 are urged away from ply 701, layer 705 elastically deforms to inhibit delamination of rotor yoke 101.

Rotor yokes, such as rotor yoke 101, are often fabricated using a fiber placement process. In a fiber placement process, one or more "tows" of fibers that are impregnated with an uncured, polymeric resin are placed onto a mold in a desired configuration. Referring to FIG. 1, tows are placed to form a loop along side portions 109 and outboard portions 113. While the tows may follow a generally straight line along side portions 109, the tows are steered in an arc along outboard portions 113. When tows are steered along an arc exhibiting a small radius, one or more of the tows may buckle if the fibers of the tow are stiff, causing the one or more tows to exhibit waviness. Such waviness is known as marcelling.

Figure 8:
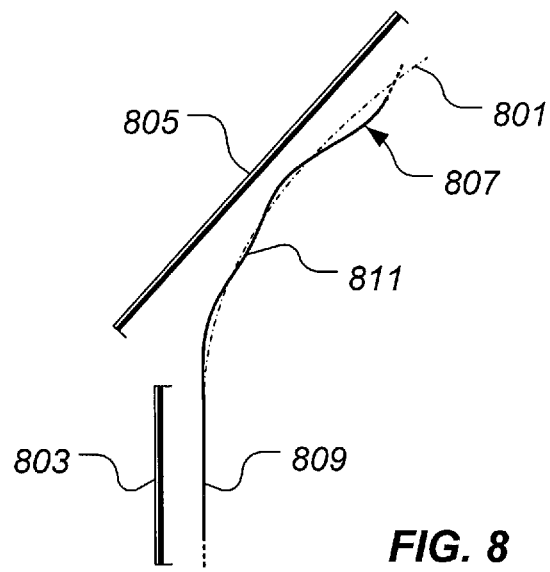
FIG. 8 is a stylized view illustrating an exemplary, desired fiber placement tow path and an exemplary, actual fiber placement tow path.

For example, as shown in FIG. 8, line 801 depicts a desired tow path having a generally straight portion 803 and a curved portion 805. Tows are actually applied, however, along an exemplary path 807, due to marcelling. The location of the tows at 809 generally correspond to straight portion 803 of desired tow path 801. In curved portion 805 of desired tow path 801, however, the tows are wavy or marcelled, generally at 811.

Conventionally, marcelling is generally undesirable because the fibers of the composite material do not lie generally parallel to the interfaces between plies, resulting in high strain levels between marcelled plies. In one embodiment, rotor yoke 101 overcomes this problem by including a toughened polymeric layer, such as polymeric layer 501 of FIG. 5, wherein one or both of plies 503 and 505 include marcelled fibers. Alternatively, rotor yoke 101 accommodates high strain levels between marcelled plies by using tows that are preimpregnated with a toughened polymeric resin. For example, if one or more plies, such as one or both of plies 601 and 603 of FIG. 6, include marcelled fibers, the plies containing marcelled fibers include a toughened polymeric resin to inhibit delamination of rotor yoke 101.

It should be noted that the locations or zones of rotor yoke 101 that are expected to experience high strain values are merely exemplary. Rotor yoke 101 may comprise a toughened polymer, as a separate layer or incorporated into a ply with reinforcing fibers, at any location or zone within rotor yoke 101 where high strain values are experienced during use of rotor yoke 101 or where high strain values are expected to be experienced during use of rotor yoke 101. For example, rotor yoke 101 may include a toughened polymer anywhere in rotor yoke 101 that a shear lag would be beneficial, such as within a tapered cross-section, e.g., flexure portions 121, of rotor yoke 101. It should be noted that, in one or more embodiments, the toughened polymer used in rotor yoke 101 is a toughened epoxy.

Moreover, it should be noted that the incorporation of a toughened polymer in rotor yoke 101 may improve laminate toughness. Damage to rotor yoke 101 in or adjacent areas that include a toughened polymer may propagate within rotor yoke 101 more slowly.

In various embodiments, rotor yoke 101 comprises a plurality of plies of composite material, such as fiberglass/epoxy composite material, produced using manual construction methods, fiber placement, tow placement, fiber winding, tow winding, or other such composite manufacturing techniques. The scope of the present application, however, encompasses any suitable composite laminate construction of rotor yoke 101, wherein rotor yoke 101 comprises a toughened polymer in one or more locations and/or one or more zones of rotor yoke 101 that are expected to experience high levels of mechanical strain.

The particular size and shape of rotor yoke 101 is merely exemplary of the present application. A rotor yoke of the present application may take on any suitable shape and be of any suitable size. A plurality of rotor yokes of the present application may be mechanically coupled with one another, so that a desired number of helicopter blades, e.g., helicopter blades 104 of FIG. 1, may be used.

The system of the present application provides significant advantages, including: (1) providing a helicopter rotor yoke that can withstand larger degrees of blade flapping; (2) providing a helicopter rotor yoke that lessens the effects of interlaminar shear strains when in use; (3) providing a helicopter rotor yoke that has a greater economic life than conventional rotor yokes; and (4) providing a more durable helicopter rotor yoke.

The particular embodiments disclosed above are illustrative only, as the system of the present application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that an application with significant advantages has been described and illustrated. Although the present application is shown in a limited number of forms, it is not limited to just these forms, but is amenable to various changes and modifications without departing from the spirit thereof.

We claim:

1. A helicopter rotor yoke, comprising:
   a composite laminate including a plurality of plies of fibers disposed in a polymeric matrix, having a flexure portion at one of a location or zone that experiences high strain levels during use of the rotor yoke, the composite laminate having;
   a first ply;
   a second ply;
   a partially extending ply that partially extends through the composite laminate located between the first ply and the second ply;
   wherein a void is created by the partially extending ply between the first ply and the second ply;
   the flexure portion in the composite laminate disposed proximate an end of the partially extending ply;
   a layer of toughened polymer disposed between the first ply and the partially extending ply;
   a layer of toughened polymer disposed in the flexure portion in the composite laminate between the first ply and the second ply, thereby filling the void from the partially extending ply;
   a layer of toughened polymer disposed between the second ply and the partially extending ply;
   wherein the layers of toughened polymer elastically deforms inhibiting delamination of the helicopter yoke.

2. The helicopter yoke, according to claim 1, wherein the toughened polymer is a toughened epoxy.

3. The helicopter yoke, according to claim 1, wherein the first ply exhibits a fiber orientation different from a fiber orientation of the second ply.

4. The helicopter yoke, according to claim 1, wherein the second ply includes a toughened polymer.

5. The helicopter yoke, according to claim 4, wherein the first ply exhibits a fiber orientation different from a fiber orientation of the second ply.

6. The helicopter yoke, according to claim 1, wherein the toughened polymer is disposed proximate a midplane of the rotor yoke.

7. The helicopter yoke, according to claim 6, wherein the toughened polymer exists as a layer between plies.

8. The helicopter yoke, according to claim 6, wherein the toughened polymer exists in one or more plies of the composite laminate.

9. The helicopter yoke, according to claim 1, wherein the toughened polymer is disposed at a location or within a zone where a shear lag is desirable.

10. The helicopter yoke, according to claim 1, wherein the toughened polymer is incorporated into a portion of the helicopter yoke exhibiting a tapered cross section.

11. The helicopter yoke, according to claim 1, wherein one or more of the plies of the composite laminate include marcelled fibers disposed in the toughened polymer.

12. The helicopter yoke, according to claim 1, wherein:
   one or more of the plies of the composite laminate include marcelled fibers; and
   the toughened polymer exists as a layer adhesively bonding the one or more plies that include marcelled fibers.

13. The helicopter yoke, according to claim 1, wherein the toughened polymer comprises:
   an elastomeric material.

* * * * *